United States Patent
Shimakawa et al.

(10) Patent No.: US 10,764,463 B2
(45) Date of Patent: Sep. 1, 2020

(54) IMAGE FORMING APPARATUS, CONTROL METHOD THEREFOR, AND STORAGE MEDIUM FOR SENDING NOTIFICATION OF AN INPUT OPERATION TO AT LEAST A USER INTERFACE

(71) Applicant: CANON KABUSHIKI KAISHA, Tokyo (JP)

(72) Inventors: Yasunori Shimakawa, Komae (JP); Atsushi Ikeda, Toride (JP); Hiroshi Oya, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/807,440

(22) Filed: Nov. 8, 2017

(65) Prior Publication Data

US 2018/0146111 A1 May 24, 2018

(30) Foreign Application Priority Data

Nov. 18, 2016 (JP) .................................. 2016-225378

(51) Int. Cl.
*H04N 1/23* (2006.01)
*H04N 1/00* (2006.01)

(52) U.S. Cl.
CPC ......... *H04N 1/2392* (2013.01); *H04N 1/0044* (2013.01); *H04N 1/00896* (2013.01); *H04N 1/00962* (2013.01)

(58) Field of Classification Search
None
See application file for complete search history.

(56) References Cited

U.S. PATENT DOCUMENTS

| 2011/0102841 A1* | 5/2011 | Morita | H04N 1/00244 358/1.15 |
| 2014/0176976 A1* | 6/2014 | Tsukahara | G03G 15/5004 358/1.13 |
| 2014/0325526 A1* | 10/2014 | Nagata | G06F 8/34 719/312 |

FOREIGN PATENT DOCUMENTS

JP 2011-209569 A 10/2011

* cited by examiner

*Primary Examiner* — Lennin R Rodriguezgonzalez
(74) *Attorney, Agent, or Firm* — Canon U.S.A., Inc. I.P. Division (57) ABSTRACT

An image forming apparatus capable of running a predetermined application program on a firmware, which includes an operation unit, a memory configured to accept a user operation via the operation unit and store a user interface program which initializes display of the operation unit in accordance with an elapse of predetermined time, and a notifying unit configured to notify the firmware and the user interface program when the user operation via the operation unit is accepted, in which while the predetermined application program is running, the notifying unit notifies the application program of operation information based on the user operation via the firmware so that the user interface program does not initialize the display of the operation unit in accordance with the elapse of the predetermined time, and the notifying unit notifies the user interface program of predetermined notification which is not based on the user operation at predetermined timing.

7 Claims, 5 Drawing Sheets

IMAGE FORMING APPARATUS, CONTROL METHOD THEREFOR, AND STORAGE MEDIUM FOR SENDING NOTIFICATION OF AN INPUT OPERATION TO AT LEAST A USER INTERFACE

BACKGROUND OF THE INVENTION

Field of the Invention

The present disclosure relates to one or more embodiments of an image forming apparatus, a control method for the image forming apparatus, and a storage medium.

Description of the Related Art

Recently, image forming apparatuses in which an arbitrary application can be run on a firmware are broadly used. Also in relatively inexpensive image forming apparatuses, an arbitrary application can be run on a firmware, without a complicated screen management process related to screen drawing (a window manager).

Further, a screensaver function which prevents burn-in on a screen in a non-operation state, and a slide show function which displays previously set slides or messages in the non-operation state are known. Hereinafter, these functions will be collectively referred to as a slide show. In an image forming apparatus in which an arbitrary application can be run on a firmware, a slide show may be implemented as one of arbitrary applications (see Japanese Patent Laid-Open No. 2011-209569).

SUMMARY OF THE INVENTION

At least one aspect of the present disclosure is an image forming apparatus capable of running a predetermined application program on a firmware, including: an operation unit; a memory configured to accept a user operation via the operation unit and store a user interface program which initializes display of the operation unit in accordance with an elapse of a predetermined time; and a notifying unit configured to notify the firmware and the user interface program when the user operation via the operation unit is accepted, in which while the predetermined application program is running, the notifying unit notifies the predetermined application program of operation information based on the user operation via the firmware so that the user interface program does not initialize the display of the operation unit in accordance with the elapse of the predetermined time, and the notifying unit notifies the user interface program of a predetermined notification which is not based on the user operation at a predetermined timing.

According to other aspects of the present disclosure, one or more additional image forming apparatuses, one or more control methods, and one or more storage mediums for use therewith are discussed herein. Further features of the present invention will become apparent from the following description of exemplary embodiments with reference to the attached drawings.

DESCRIPTION OF THE EMBODIMENTS

Hereinafter, embodiments of the present disclosure will be described in detail with reference to the drawings. Note that the embodiments below are not limiting the present disclosure related to the claims and that not all the combinations of the features described in the embodiments are necessary to solve the problems of the present disclosure. Though the present embodiment will be described with reference to a multifunction peripheral (MFP) related to an information processing apparatus of the present disclosure as an example, the present disclosure is not limited to such an MFP.

Figure 1:
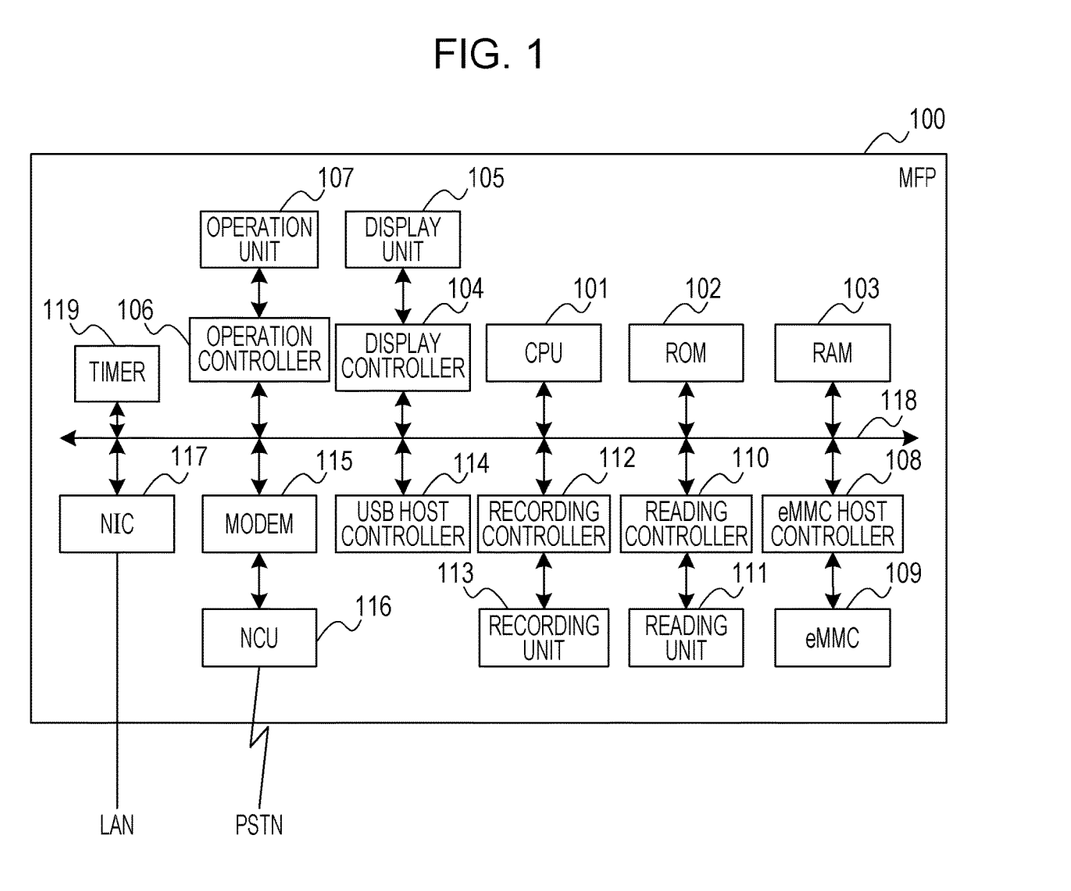
FIG. 1 is a block diagram illustrating a hardware configuration of an MFP according to at least one embodiment of the present disclosure.

FIG. 1 is a block diagram illustrating a hardware configuration of an MFP 100 according to an embodiment of the present disclosure.

The MFP 100 includes a CPU 101, a ROM 102, a RAM 103, a display controller 104, a display unit 105, an operation controller 106, and an operation unit 107. The MFP 100 also includes an eMMC host controller 108, an eMMC 109, a reading controller 110, a reading unit 111, a recording controller 112, and a recording unit 113. The MFP 100 further includes a USB host controller 114, a modem 115, a network control unit (NCU) 116, and a network interface card (NIC) 117.

The CPU 101 collectively controls devices connected to a system bus 118. When power is supplied to the CPU 101, the CPU 101 executes a boot program stored in the ROM 102. Usually, the boot program develops a main program stored in a storage (e.g., the eMMC 109) to the RAM 103 and jumps to a leading position of the developed main program. The RAM 103 functions not only as a loading place of the main program but also as a work area of the main program, for example. The CPU 101 executes later-described control with reference to a flowchart, and executes various processes related to the present embodiment.

The display controller 104 controls drawing on the display unit 105. The display unit 105 is a WVGA-size full-bitmap display unit. The operation controller 106 controls input from the operation unit 107. The operation unit 107 includes a touch panel superimposed on the display unit 105, various hard keys, and so forth. The reading unit 111 reads a document. An automatic document feeder (not illustrated) is mounted on the reading unit 111 as an optional part, which enables automatic feeding of a plurality of documents to be read. The reading unit 111 is connected to the reading controller 110, and the CPU 101 sends and receives data to and from the reading unit 111 via the reading controller 110.

The recording unit 113 forms (prints) an image on a recording paper (a sheet) by an electrophotographic method, for example. The recording unit 113 is connected to the recording controller 112, and the CPU 101 sends and receives data to and from the recording unit 113 via the recording controller 112. The USB host controller 114 performs USB protocol control, and mediates access to a USB device, such as a USB memory device (not illustrated). The modem 115 performs modulation and demodulation of signals necessary for facsimile communication. The modem 115 is connected to the NCU 116. Signals modulated by the modem 115 are sent to a public switched telephone network (PSTN) via the NCU 116. The NIC 117 bidirectionally exchanges e-mails, files, etc. with a server, for example, via a LAN. A timer 119 is used to measure later-described non-operation time, and so forth and starts and stops the clocking operation in accordance with an instruction of the CPU 101.

The MFP 100 according to the embodiment includes the eMMC 109 as a storage. The CPU 101 accesses the eMMC 109 via the eMMC host controller 108 and writes and reads data to and from the eMMC 109.

Figure 2:
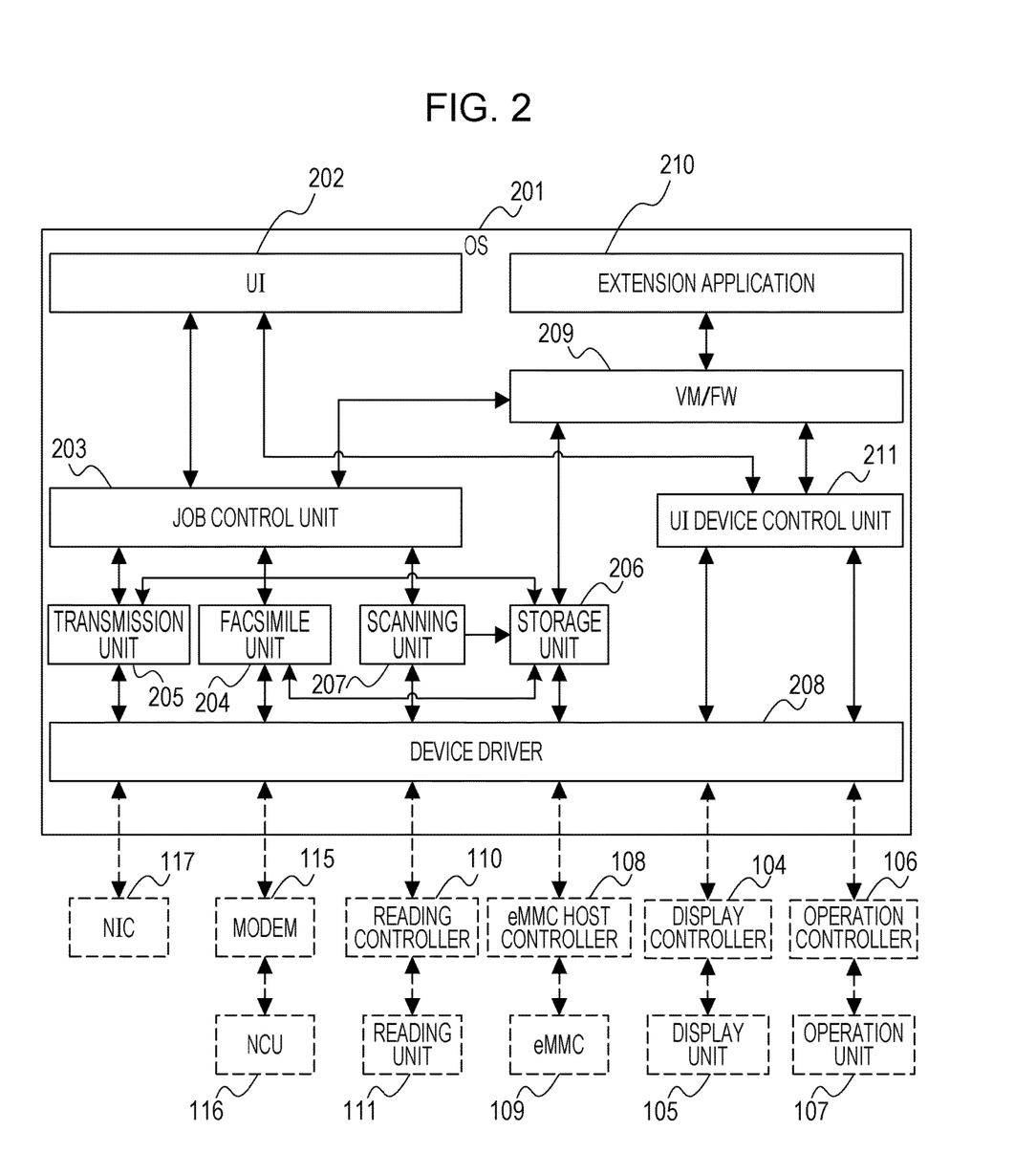
FIG. 2 is a block diagram illustrating a software configuration of the MFP according to the at least one embodiment.

FIG. 2 is a block diagram illustrating a software configuration of the MFP 100 according to the embodiment. The parts depicted by the solid line in FIG. 2 are software modules implemented when the CPU 101 executes the program developed to the RAM 103 by the boot program described above. In FIG. 2, the same parts as those illustrated in FIG. 1 are denoted by the same reference numerals.

An operating system (OS) 201 manages and controls execution of each of later-described modules of the main program. A device driver 208 is combined with the OS 201. The device driver 208 mediates exchange data with hardware devices, such as the display controller 104, the operation controller 106, and the reading controller 110.

A job control unit 203 receives a job, such as copy, print, facsimile, etc., and controls execution of the received job. A storage unit 206 is a software module which physically stores data, such as image data to be sent and received by facsimile, and user setting data, etc. in the eMMC 109 and manages the stored data.

For example, in the MFP 100 according to the present embodiment, when the job control unit 203 receives a job for facsimile transmission, a scanning unit 207 controls the reading unit 111 in response to the job request and scans the document. The scanning unit 207 then stores image data obtained by scanning the document in the storage unit 206. The image data stored in the storage unit 206 is read by a facsimile unit 204 and sent to a destination by facsimile via the modem 115 and the NCU 116. The image data received by facsimile from a communication party via the modem 115 and the NCU 116 is taken in by the facsimile unit 204, and is stored in the storage unit 206.

The MFP 100 according to the present embodiment includes a virtual machine (VM)/framework (FW) 209 which is an execution environment of an extension application for causing an arbitrary application program to be run on a firmware. An extension application 210 includes an arbitrary program and so forth described in a script language. The VM/FW 209 installs an arbitrary program described in a script language in the extension application 210, and uninstalls the program from the extension application 210. Further, the VM/FW 209 intervenes a function implemented by an arbitrary program installed in the extension application 210 and an existing function, and so forth. The VM/FW 209 interprets and executes a script language described in the program of the extension application 210. Therefore, the MFP 100 according to the present embodiment can easily implement arbitrary functions, such as a slide show, while maintaining installability/uninstallability of the function.

A UI device control unit 211 according to the present embodiment mediates outputs of various types of information to the display unit 105 by a UI (an operation control unit) 202 and the extension application 210, and transmission of the user operation via the operation unit 107 to the UI 202 and the extension application 210.

Figure 3:
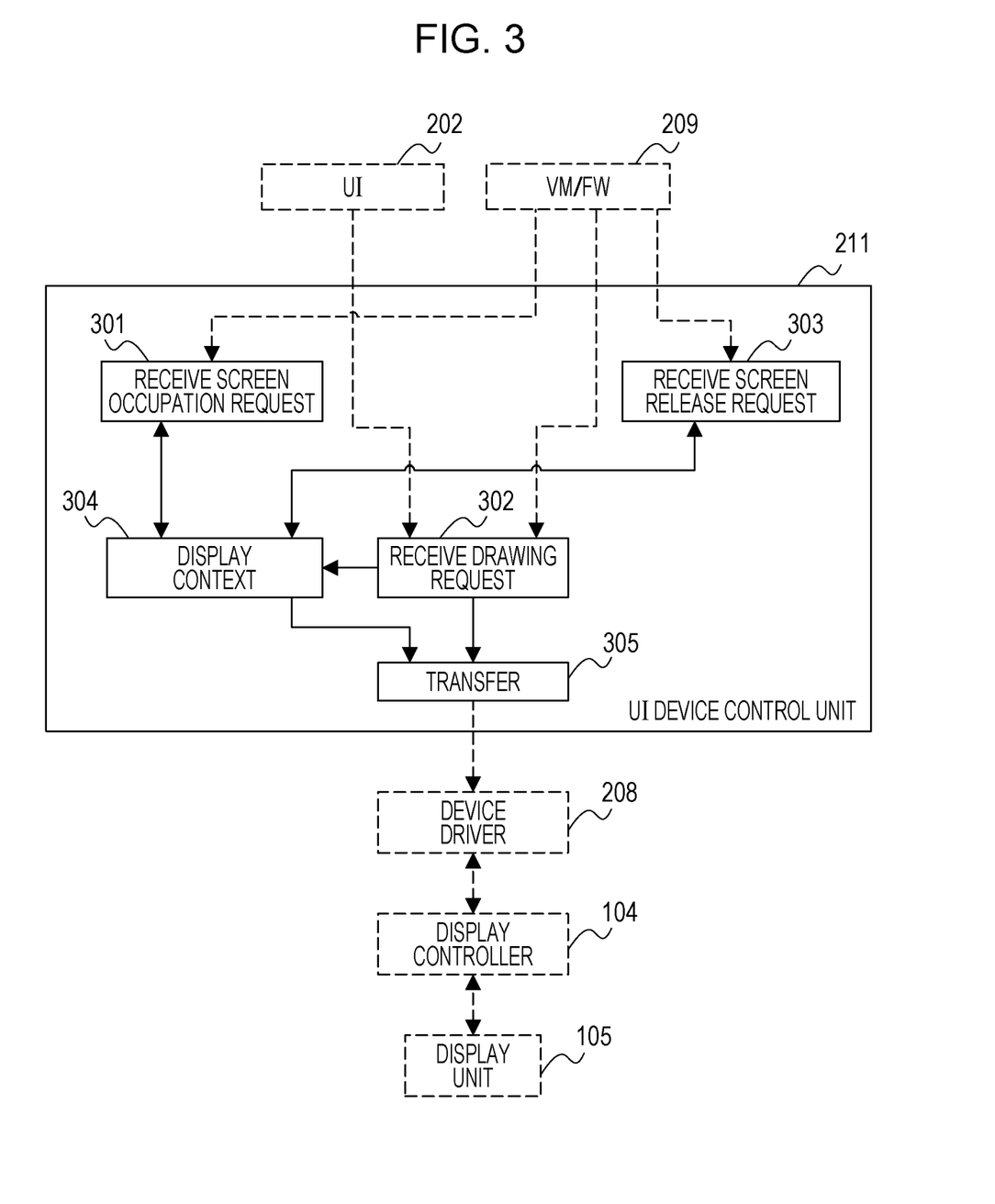
FIG. 3 is a detailed software configuration diagram illustrating a module related to display in a UI device control unit according to the at least one embodiment.

FIG. 3 is a detailed software configuration diagram illustrating a module related to display in the UI device control unit 211 according to the embodiment. In FIG. 3, the same parts as those illustrated in FIG. 2 are denoted by the same reference numerals.

As illustrated in FIG. 3, the UI device control unit 211 includes a screen occupation request reception module 301, a drawing request reception module 302, a screen release request reception module 303, a display context (DC) 304, and a transfer module 305.

The DC 304 is assigned to the RAM 103, and is configured to keep an occupation state of virtual video RAM (VRAM) which simulates the display unit 105. The screen occupation request reception module 301 assigns the DC 304 when receives a screen occupation request by the extension application 210 sent via the VM/FW 209. On the other hand, the screen release request reception module 303 releases the DC 304 when receives a screen release request by the extension application 210 sent via the VM/FW 209.

The drawing request reception module 302 accepts a request for screen drawing by the UI 202, or screen drawing by the extension application 210 sent via the VM/FW 209. Then, the drawing request reception module 302 draws the DC 304 on the VRAM in accordance with the occupation state of the screen, or transfers the drawing by the UI 202 or the contents of the VRAM to the display unit 105 via the transfer module 305, the device driver 208, and the display controller 104 in this order. Details will be described later.

Figure 4:
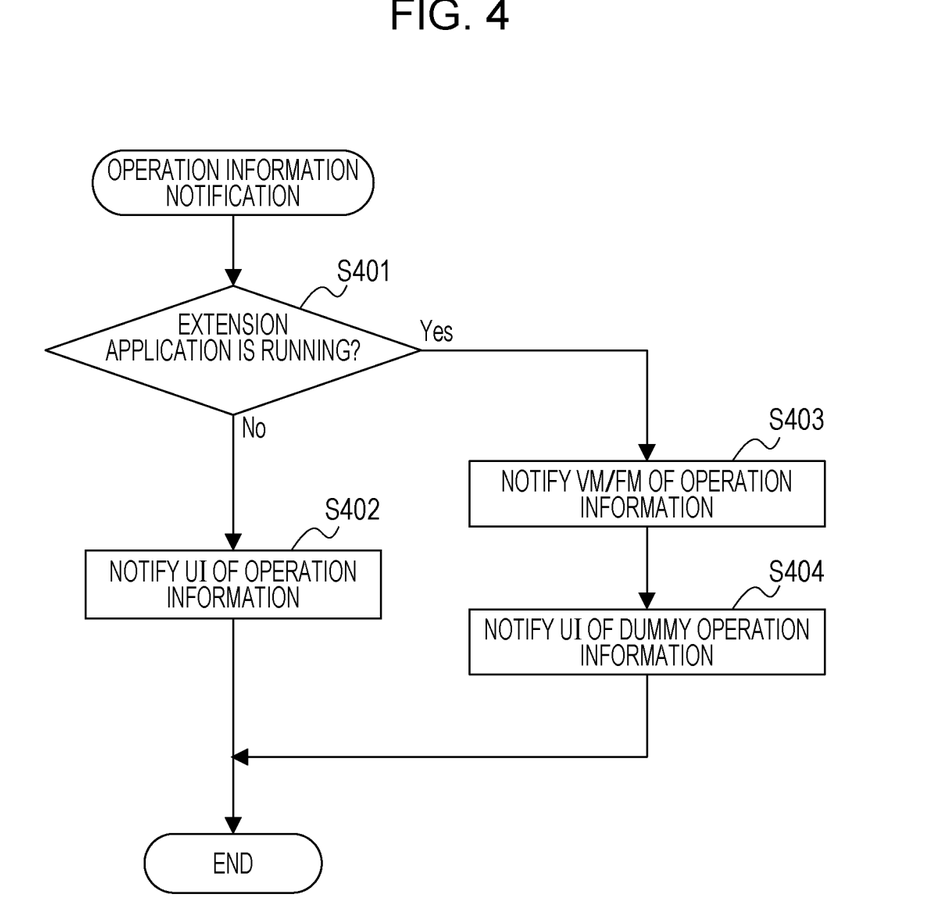
FIG. 4 is a flowchart illustrating a process of operation information from an operation unit by the UI device control unit in the MFP according to the at least one embodiment.

FIG. 4 is a flowchart illustrating a process of operation information from the operation unit 107 by the UI device control unit 211 in the MFP 100 according to the embodiment. Since this process is implemented when the CPU 101 executes the program developed to the RAM 103 by the boot program described above, here, description will be provided with the CPU 101 which functions as the UI device control unit 211 being defined as a subject of the process.

First, in S401, the CPU 101 determines whether the extension application 210 is running. If the extension application is not running, the process proceeds to S402, and operation information is notified to the UI 202. For example, when a copy function which is a native application is instructed by pressing a start key of the operation unit 107, the device driver 208 is notified of the operation information of pressing of the start key input from the operation unit 107 via the operation controller 106. Then, the device driver 208 notifies the UI device control unit 211 of the operation information. Since the UI device control unit 211 is executing the native application, the UI device control unit 211 notifies the UI 202 of the operation information. Therefore, the UI 202 recognizes that the operation is the pressing of the start key of the operation unit 107, determines that the application is the pressing of the start key of the copy function, and notifies the job control unit 203 of starting copy. Then, copy is performed.

If the CPU 101 determines in S401 that the extension application is running, the process proceeds to S403, and the CPU 101 notifies the VM/FM 209 of the operation information. Then the process proceeds to S404 in which the CPU 101 notifies the UI 202 of dummy operation information and completes the process.

A specific example will be described. For example, an ID card copy application as an extension application, which is a copy made by using an ID card will be described. When reading of the ID card is performed by pressing the start key of the operation unit 107, the device driver 208 is notified of the operation information of pressing of the start key input from the operation unit 107 via the operation controller 106.

Then, the device driver 208 notifies the UI device control unit 211 of the operation information. At this time, since the UI device control unit 211 is executing the extension application 210, the UI device control unit 211 notifies the VM/FW 209 of the received operation information and notifies the UI 202 of dummy operation information. Therefore, the VM/FW 209 recognizes that the operation is the pressing of the start key, and notifies the pressing of the start key in the ID card copy application which is the extension application 210. Then the ID card copy application which is the extension application 210 determines that the operation is the pressing of the start key, and notifies the job control unit 203 of the start of the ID card copy application via the VM/FW 209, and executes the application.

An operation unit control unit (user interface: UI) 202 according to the present embodiment provides a user with various types of information via the display unit 105 and the operation unit 107, and receives various instructions from the user. The UI 202 also performs timer monitoring control of shift to a sleep state, return from the sleep state, initialization of screen display, and so forth. Details are described later.

As described above, since the application occupies the UI 202 during execution of the extension application 210, operation information via the operation unit is not notified to the UI 202. Therefore, the following phenomenon can be avoided: it is determined that predetermined or longer non-operation time has elapsed though the application is running, and the screen is shifted to a sleep state or a screensaver is started.

Figure 5:
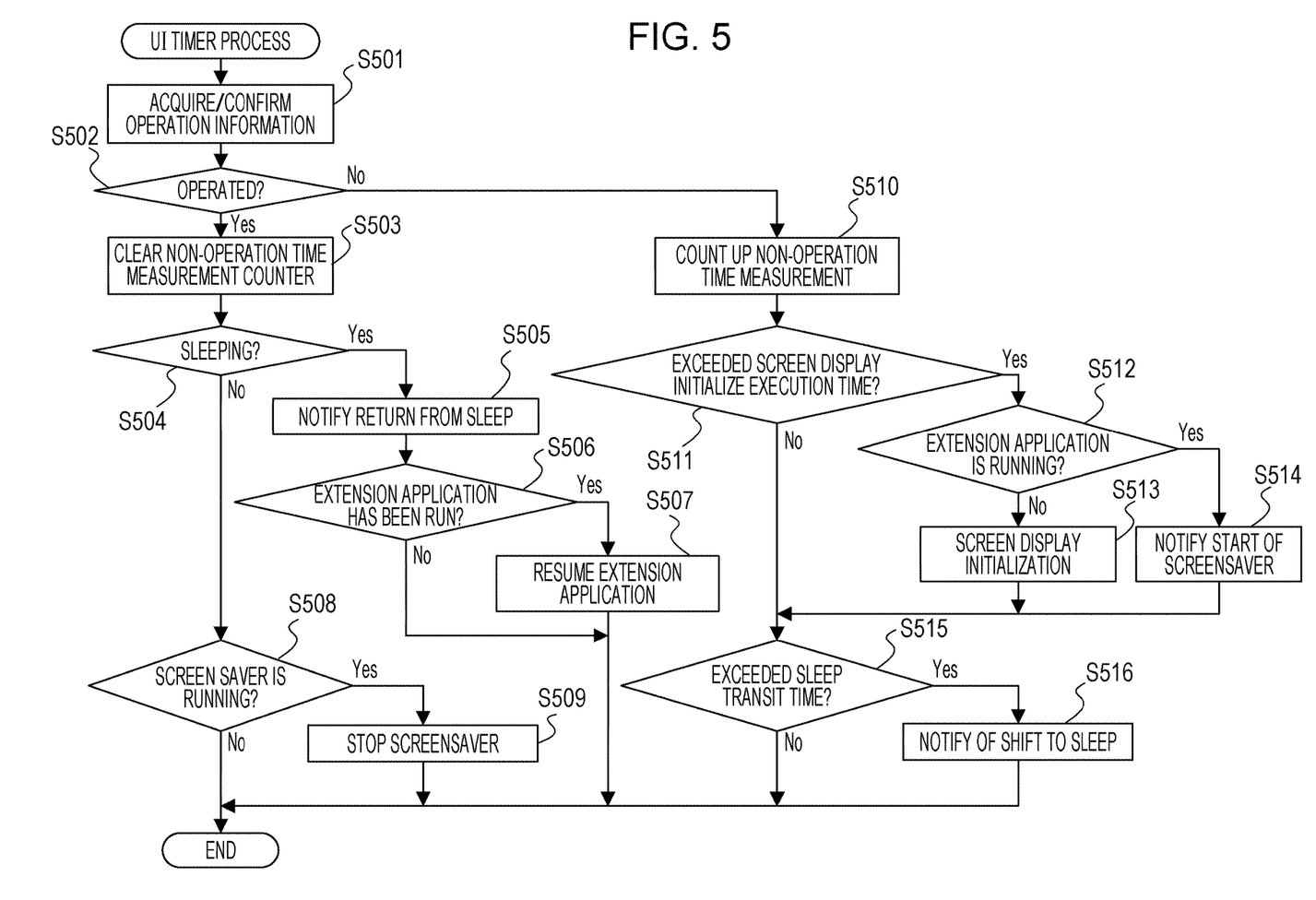
FIG. 5 is a flowchart illustrating a timer process by a UI in the MFP according to the at least one embodiment.

FIG. 5 is a flowchart illustrating a timer process by the UI 202 in the MFP 100 according to the embodiment. Since this process is implemented when the CPU 101 executes the program developed to the RAM 103 by the boot program described above, here, description will be provided with the CPU 101 which executes the UI 202 being defined as a subject of the process.

First, in S501, the CPU 101 periodically checks operation information for every clocked predetermined time measured by a timer, for example. If the native application is running, the operation information is the operation information obtained from the operation unit 107 via the UI device control unit 211. If the extension application is running, the UI device control unit 211 notifies the VM/FW 209 of the operation information from the operation unit 107, and the operation information is dummy operation information notified to the UI 202. In this manner, if the CPU 101 detects in S502 that there has been a user operation based on the operation information, the process proceed to S503, and counts of the timer 119 measuring unillustrated non-operation time is cleared. Then the process proceeds to S504 and the CPU 101 determines whether the screen is in a sleep state. If the screen is in the sleep state, the process proceeds to S505, and notifies the job control 203, for example, to return from the sleep state, and the process proceeds to S506. In S506, the CPU 101 determines whether the extension application 210 has been run before shifting to the sleep state. If the extension application 210 has been run, the process proceeds to S507, and the extension application 210 is resumed and the process is completed. In S506, if the extension application 210 has not been run, the process is completed.

If it is determined in S504 that the screen is not in the sleep state, the process proceeds to S508 and the CPU 101 determines whether a slide show (a screensaver) is running. If it is determined that the slide show is running, the process proceeds to S509, and a stop process of the slide show is performed, and the process returns to execution of the extension application 210, and the process is completed. If it is determined in S508 that the slide show is not running, a normal restore operation is executed. When the extension application 210 is running, the screen display is shifted to the slide show (the screensaver) when the time for the initialization process of the screen display elapses. Therefore, when the slide show is stopped, the process returns to the execution of the extension application 210.

If it is determined in S502 that there is no operation information, the process proceeds to S510, and the CPU 101 performs count up of measurement by using the timer 119 for the measurement of the non-operation time. Next, the process proceeds to S511 and the CPU 101 determines whether the measured elapsed time exceeds execution time for initialization of the screen display. If the elapsed time exceeds the execution time for initialization, the process proceeds to S512 and the CPU 101 determines whether the extension application 210 is running. If it is determined that the extension application 210 is not running, the process proceeds to S513, and the initialization process of the screen display is performed and the process proceeds to S515. If it is determined in S512 that the extension application 210 is running, the process proceeds to S514, and the slide show (the screensaver) is activated via the job control unit 203, and the process proceeds to S515.

In S515, the CPU 101 determines whether the non-operation time measured by the timer 119 has exceeded time to shift to the sleep state. If it is determined that the non-operation time has exceeded the time to shift to the sleep state, the process proceeds to S516. In S516, the CPU 101 notifies the job control unit 203 to shift to the sleep state and completes the process. If the slide show (the screensaver) is currently operating at this time, that slide show is stopped and the state is shifted to the sleep state. If it is determined in S515 that the non-operation time has not exceeded the time to shift to the sleep state, the process is completed.

As described above, according to the present embodiment, addition of a function for measuring non-operation time by the user and starting the slide show (the screensaver) to the extension application can be made unnecessary.

As described above, some relatively inexpensive image forming apparatuses having no window manager include a virtual machine (VM) which is an execution environment of an extension application to cause an arbitrary application to be run on a firmware. According to the present embodiment, in such apparatuses, it is also possible to meet a demand for realizing a slide show function by using the VM.

Problems which can be solved by the present embodiment will be described below. For example, in an operating system (OS) of a personal computer in which setting which requires user authentication is performed, start-up of the slide show is performed by measuring time of a non-operation state. The OS of the personal computer can check that the state is a non-operation state by monitoring no input event occurs. However, an application on the VM or a framework (FW) for operating the VM separates a path for notifying the operation information from the operation control unit (UI) which is the native application of the image forming apparatus, and obtains the operation information. Therefore, there is a problem that the UI recognizes the state as a non-operation state even if the application on the VM or the FW is run, and if predetermined time elapses with the UI recognizing the state as the non-operation state, the screen display is initialized and the screen is shifted to a sleep state, for example. If the function of the UI is stopped in order to avoid this problem, the non-operation state needs to be recognized and the screen needs to be shifted to a sleep state, and if necessary, the screen display needs to be initialized by the extension application or the FM. For this reason, there is a problem that it is necessary to add a timer function. The present embodiment has solved these problems.

The present embodiment has an effect that a non-operation state can be recognized with an arbitrary application program which is run on a firmware, without the need of providing a complicated window manager related to a screen drawing, and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-225378 filed Nov. 18, 2016, which is hereby incorporated by reference herein in its entirety.

What is claimed is:

1. An image forming apparatus capable of running a predetermined application program on a framework operating with a virtual machine, the image forming apparatus comprising:
   an operation or input receiver;
   a timer configured to count a non-operation time in which an operation using the operation or input receiver is not performed;
   a memory configured to store instructions and a user interface program which clears the non-operation time counted by the timer and initializes display of the operation or input receiver in accordance with an elapse of a predetermined time in the non-operation time; and
   one or more processors that execute the instructions to:
   notify the framework and the user interface program in accordance that a user operation via the operation or input receiver is received while the predetermined application program is running so that the user interface program does not initialize the display of the operation or input receiver by clearing the non-operation time counted by the timer in a case where the user operation is received before the timer counts the predetermined time, and notify the user interface program in accordance that the user operation via the operation or input receiver is received while the predetermined application program is not running.

2. The image formation apparatus according to claim 1, wherein a non-operation elapsed time in which the operation information notified from the one or more processors is not notified is measured and, when the non- operation elapsed time becomes the predetermined time, the image forming apparatus is controlled so that a slide show is displayed on the operation or input receiver if the application program is running.

3. The image forming apparatus according to claim 2, wherein the predetermined time is time to initialize a screen display.

4. The image forming apparatus according to claim 2, wherein when the operation information is notified from the user interface program, measuring of the non-operation elapsed time is stopped, and if the slide show is running, the slide show is stopped.

5. The image forming apparatus according to claim 2, wherein when the operation information is notified:
   measurement of the non-operation elapsed time is initialized;
   if the screen is in a sleep state, the image forming apparatus is controlled to return from the sleep state;
   and if an application program has been run before, the application program is resumed.

6. The image formation apparatus according to claim 1, wherein a non-operation elapsed time in which the operation information notified from the one or more processors is not notified is measured and, when the non- operation elapsed time becomes the predetermined time, the image forming apparatus is controlled to initialize a screen display if the application program is not running on the framework.

7. A method for controlling an image forming apparatus capable of running a predetermined application program on a framework operating with a virtual machine, which includes an operation or input receiver, a timer configured to count a non-operation time in which an operation using the operation or input receiver is not performed, a memory configured to store instructions and a user interface program which clears the non-operation time counted by the timer and initializes display of the operation or input receiver in accordance with an elapse of a predetermined time in the non-operation time, in which the method is caused when a processor provided in the image forming apparatus executes the instructions, the method comprising the operations of:
   notifying the framework and the user interface program in accordance that the user operation via the operation or input receiver is received while the predetermined application program is running so that the user interface program does not initialize the display of the operation or input receiver by clearing the non-operation time counted by the timer in a case where the user operation is received before the time counts the predetermined time; and notifying the user interface program in accordance that the user operation via the operation or input receiver is received while the predetermined application program is not running.

* * * * *